(12) United States Patent
Kim et al.

(10) Patent No.: US 10,470,123 B2
(45) Date of Patent: Nov. 5, 2019

(54) METHOD AND APPARATUS FOR CONTROLLING DISCONTINUOUS RECEPTION IN MOBILE COMMUNICATION SYSTEM

(71) Applicant: Samsung Electronics Co., Ltd., Gyeonggi-do (KR)

(72) Inventors: Soeng Hun Kim, Gyeonggi-do (KR); Himke Van Der Velde, Apeldoorn (NL)

(73) Assignee: Samsung Electronics Co., Ltd., Suwon-si (KR)

( * ) Notice: Subject to any disclaimer, the term of this patent is extended or adjusted under 35 U.S.C. 154(b) by 171 days.

(21) Appl. No.: 14/552,280

(22) Filed: Nov. 24, 2014

(65) Prior Publication Data

US 2015/0103718 A1    Apr. 16, 2015

Related U.S. Application Data

(63) Continuation of application No. 12/590,065, filed on Nov. 2, 2009, now Pat. No. 8,902,813.

(30) Foreign Application Priority Data

Nov. 3, 2008   (KR) .................. 10-2008-0108535

(51) Int. Cl.
*H04W 76/04*   (2009.01)
*H04W 52/02*   (2009.01)
*H04W 76/28*   (2018.01)

(52) U.S. Cl.
CPC ....... *H04W 52/0225* (2013.01); *H04W 76/28* (2018.02); *Y02D 70/1224* (2018.01);
(Continued)

(58) Field of Classification Search
CPC . H04W 76/048; H04W 52/0225; Y02B 60/50
See application file for complete search history.

(56) References Cited

U.S. PATENT DOCUMENTS 8,532,599 B2 * 9/2013 DiGirolamo ...... H04W 36/0011
                                                    455/229
2003/0147371 A1   8/2003 Choi et al.
(Continued)

FOREIGN PATENT DOCUMENTS

KR   1020020031866 A   5/2002
KR   1020060063317 A   6/2006
(Continued)

OTHER PUBLICATIONS

Decision of Patent dated Jan. 14, 2015 in connection with Korean Patent Application No. 10-2008-0108535; 5 pages.
(Continued)

*Primary Examiner* — Noel R Beharry
*Assistant Examiner* — Ruihua Zhang

(57) ABSTRACT

A method and apparatus is configured to control a discontinuous reception (DRX) in a mobile communication system. The method includes: interrupting the DRX operation when a radio resource control (RRC) connection reestablishment procedure is initiated; transmitting an RRC connection reestablishment request message from the user equipment to an evolved node B (ENB); receiving an RRC connection reestablishment message from the ENB to the user equipment; and resuming, if the received RRC connection reestablishment message contains new DRX setting information, the interrupted DRX operation according to the new DRX setting information. The DRX operation can be interrupted or resumed at a proper time point when an RRC connection is reestablished or reconfigured or a handover is performed, thereby reducing power consumption in the user equipment.

16 Claims, 10 Drawing Sheets

(52) U.S. Cl.
CPC ...... *Y02D 70/1242* (2018.01); *Y02D 70/1262* (2018.01); *Y02D 70/23* (2018.01); *Y02D 70/24* (2018.01)

(56) References Cited

U.S. PATENT DOCUMENTS

| | | |
|---|---|---|
| 2005/0143107 A1 | 6/2005 | Pattar et al. |
| 2007/0049308 A1 | 3/2007 | Lindoff et al. |
| 2007/0291729 A1 | 12/2007 | Dalsgaard et al. |
| 2008/0090573 A1* | 4/2008 | Kim .................. H04W 36/08 455/436 |
| 2008/0130488 A1* | 6/2008 | Kuo .................. H04L 1/1812 370/216 |
| 2008/0198795 A1 | 8/2008 | Kim et al. |
| 2008/0227442 A1 | 9/2008 | Pani et al. |
| 2008/0299996 A1* | 12/2008 | Tseng .................. H04W 76/28 455/458 |
| 2009/0034452 A1* | 2/2009 | Somasundaram ... H04J 11/0069 370/328 |
| 2009/0061878 A1* | 3/2009 | Fischer .................. G08C 17/02 455/436 |
| 2010/0015984 A1 | 1/2010 | Kazmi |
| 2010/0135220 A1 | 6/2010 | Bergstrom et al. |

FOREIGN PATENT DOCUMENTS

| | | |
|---|---|---|
| KR | 10-2008-0034380 | 4/2008 |
| KR | 10-2008-0067293 | 7/2008 |

OTHER PUBLICATIONS

International Search Report dated May 31, 2010 in connection with International Patent Application No. PCT/KR2009/006410.
Samsung, "Miscellaneous Corrections and Clarifications", 3GPP TSG-RAN #63bis meeting, Prague, Czech Republic, Sep. 29-Oct. 3, 2008, R2-085978,197 pages.

* cited by examiner

METHOD AND APPARATUS FOR CONTROLLING DISCONTINUOUS RECEPTION IN MOBILE COMMUNICATION SYSTEM

CROSS-REFERENCE TO RELATED APPLICATION(S) AND CLAIM OF PRIORITY

This application is a continuation of U.S. patent application Ser. No. 12/590,065 filed Nov. 2, 2009, entitled "METHOD AND APPARATUS FOR CONTROLLING DISCONTINUOUS RECEPTION IN MOBILE COMMUNICATION SYSTEM", which is related to and claims the benefit under 35 U. S. C. § 119 a of a Korean patent application filed in the Korean Intellectual Property Office on Nov. 3, 2008 and assigned Serial No. 10-2008-0108535, and the entire disclosure of both of which are hereby incorporated by reference.

TECHNICAL FIELD OF THE INVENTION

The present invention relates to mobile communication system, and more particularly, to a method and apparatus that controls resumption of discontinuous reception that was interrupted after a radio resource control (RRC) connection reestablishment or a handover.

BACKGROUND OF THE INVENTION

Universal mobile telecommunication service (UMTS) systems refer to the $3^{rd}$ generation asynchronous mobile communication system that is based on global system for mobile communications (GSM) and general packet radio service (GPRS) and uses wideband code division multiple access (WCDMA).

Presently, the $3^{rd}$ generation partnership project (3GPP) standardizing UMTS is discussing long term evolution (LTE) as the next generation mobile communication system. LTE relates to a technology that implements fast packet based communication of the transmission rate, maximum 100 Mbps, and will be commercialized in 2010. To this end, many possible methods are under consideration, such as a method for simplifying the network structure and thus reducing the number of nodes located on the communication path, and a method for accessing radio protocol to a radio channel.

In an LTE mobile communication system, user equipment establishes a network and a radio resource control (RRC) connection. Establishing an RRC connection means establishing a signaling radio bearer that performs transmission and reception of control messages, such as an RRC control message, and the like. User equipment establishing an RRC connection is said to be in an RRC connection state.

The LTE mobile communication system applies discontinuous reception (DRX) to user equipment in an RRC connection state, thereby reducing power consumption. If DRX is established to user equipment in an RRC connection state, the user equipment monitors a forward control channel at a preset time point to check whether scheduling is performed. If scheduling has been performed, the user equipment performs data transmission/reception according to a procedure. Conversely, if scheduling has not been performed, the user equipment does not monitor the forward control channel until the next time point. These operations then are repeated.

Alternatively, if failures happen, user equipment in an RRC connection state starts an RRC connection reestablishment procedure. Examples of the failures are a radio link failure, a handover failure, and a failure to perform a command set by an ENB. Radio link failure refers to a case where, due to the aging of a channel in the user equipment, the user equipment cannot perform normal communication in a current cell. Handover failure refers to a case where user equipment cannot be moved to a cell where a handover of the user equipment is performed.

When an RRC connection reestablishment procedure starts, user equipment in an RRC connection state searches for and selects one of the cells, which provides adequate channel quality, and then transmits an RRC connection reestablishment request message to the selected cell. If the selected cell recognizes the user equipment, or contains information regarding the RRC connection of the user equipment, the ENB transmits an RRC connection reestablishment message to the user equipment and commands the user equipment to perform an RRC connection reestablishment. Conversely, if the selected cell does not recognize the corresponding user equipment, the ENB transmits an RRC connection reestablishment reject message to the user equipment and releases the RRC connection of the user equipment.

Presently, the LTE standard does not specify whether to retain discontinuous reception of user equipment or to change the discontinuous reception to new settings, when an RRC connection reestablishment procedure starts or a handover procedure starts in the user equipment in which a discontinuous reception was set.

SUMMARY OF THE INVENTION

To address the above-discussed deficiencies of the prior art, it is a primary object to provide a method and procedure for performing a discontinuous reception (DRX) in user equipment, in which a discontinuous reception was set, when an RRC connection reestablishment procedure starts or a handover procedure starts.

The present invention further provides a method and apparatus for controlling discontinuous reception, by determining a time point to resume the interrupted DRX, after an RRC connection reestablishment or a handover.

In accordance with a first exemplary embodiment of the present invention, the present invention provides a method for controlling discontinuous reception (DRX) of user equipment in a mobile communication system, where the method includes: interrupting the DRX operation when a radio resource control (RRC) connection reestablishment procedure is initiated; transmitting an RRC connection reestablishment request message from the user equipment to an evolved node B (ENB); receiving an RRC connection reestablishment message from the ENB to the user equipment; and resuming, if the received RRC connection reestablishment message contains new DRX setting information, the interrupted DRX operation according to the new DRX setting information.

In accordance with a second exemplary embodiment of the present invention, the present invention provides a method for controlling discontinuous reception (DRX) of user equipment in a mobile communication system, where the method includes: interrupting the DRX operation when a radio resource control (RRC) connection reestablishment procedure is initiated; transmitting an RRC connection reestablishment request message from the user equipment to an evolved node B (ENB); receiving an RRC connection reestablishment message from the ENB to the user equipment; receiving, if the received RRC connection reestablishment message does not contain new DRX setting information, an RRC connection reconfiguration message; and resuming, if the received RRC connection reconfiguration message contains new DRX setting information, the interrupted DRX operation according to the new DRX setting information.

In accordance with a third exemplary embodiment of the present invention, the present invention provides a method for controlling discontinuous reception (DRX) when user equipment performs a handover, where the method includes: performing measurement according to measurement configuration received from a source evolved node B (source ENB); transmitting a measurement result report message for a measurement that is set to interrupt the DRX operation to the source ENB and interrupting the DRX operation; and resuming the interrupted DRX operation after the user equipment receives a handover command from the source ENB and has completed a random access with a target evolved node B (target ENB).

In accordance with a first exemplary embodiment of the present invention, the present invention provides an apparatus for controlling a discontinuous reception (DRX) in a mobile communication system, where the apparatus includes: a radio resource controller configured to interrupt the DRX operation when a radio resource control (RRC) connection reestablishment procedures is initiated, and configured to resume, if an RRC connection reestablishment message contains new DRX operation setting information, the interrupted DRX operation according the new DRX operation setting information; and a DRX controller configured to control the DRX operation for the transmission and reception of the user equipment according to the control of the radio resource controller.

In accordance with a second exemplary embodiment of the present invention, the present invention provides an apparatus for controlling a discontinuous reception (DRX) in a mobile communication system, where the apparatus includes: a radio resource controller configured to interrupt the DRX operation when a radio resource control (RRC) connection reestablishment procedures is initiated, receive an RRC connection reconfiguration message if the received RRC connection reestablishment message does not contain new DRX setting information, and, if the received RRC connection reconfiguration message contains new DRX setting information, resume the interrupted DRX operation according to the new DRX setting information; and a DRX controller configured to control the DRX operation for the transmission and reception of the user equipment according to the control of the radio resource controller.

In accordance with a third exemplary embodiment of the present invention, the present invention provides an apparatus for controlling discontinuous reception (DRX) when a handover is performed, where the apparatus includes: a radio resource controller configured to interrupt the DRX operation when user equipment transmits a measurement result report message for a measurement set to interrupt a DRX to a source evolved node B (source ENB), and resume the interrupted DRX operation when the user equipment receives a handover command from the source ENB and completes a rand access with a target evolved node B (target ENB); and a DRX controller configured control the DRX operation for the transmission and reception of the user equipment according to the control of the radio resource controller.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communication network.

The method and apparatus for controlling discontinuous reception (DRX), according to the present invention, will be explained based on three embodiments. A first embodiment is a method for resuming discontinuous reception (DRX) after RRC connection reestablishment in user equipment. A second embodiment is a method for resuming discontinuous reception (DRX) after RRC connection reconfiguration in user equipment. A third embodiment is a method for resuming discontinuous reception (DRX) after completing a handover.

Figure 1:
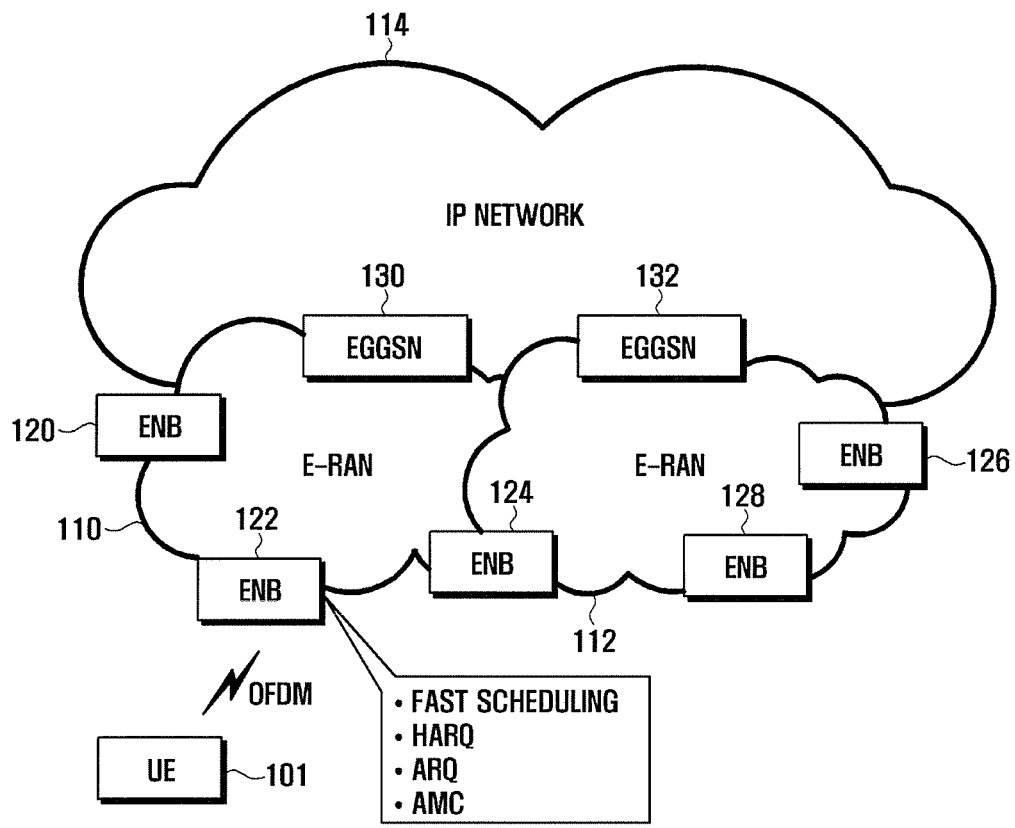
FIG. 1 is a schematic block diagram illustrating a next generation mobile communication system according to an embodiment of the present invention.
Figure 2:
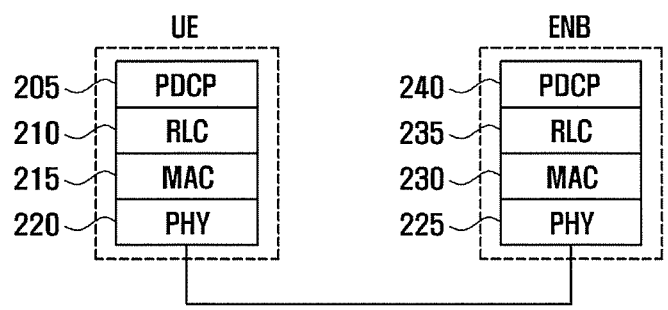
FIG. 2 is a view illustrating radio protocol standardized in an LTE system.
Figure 3:
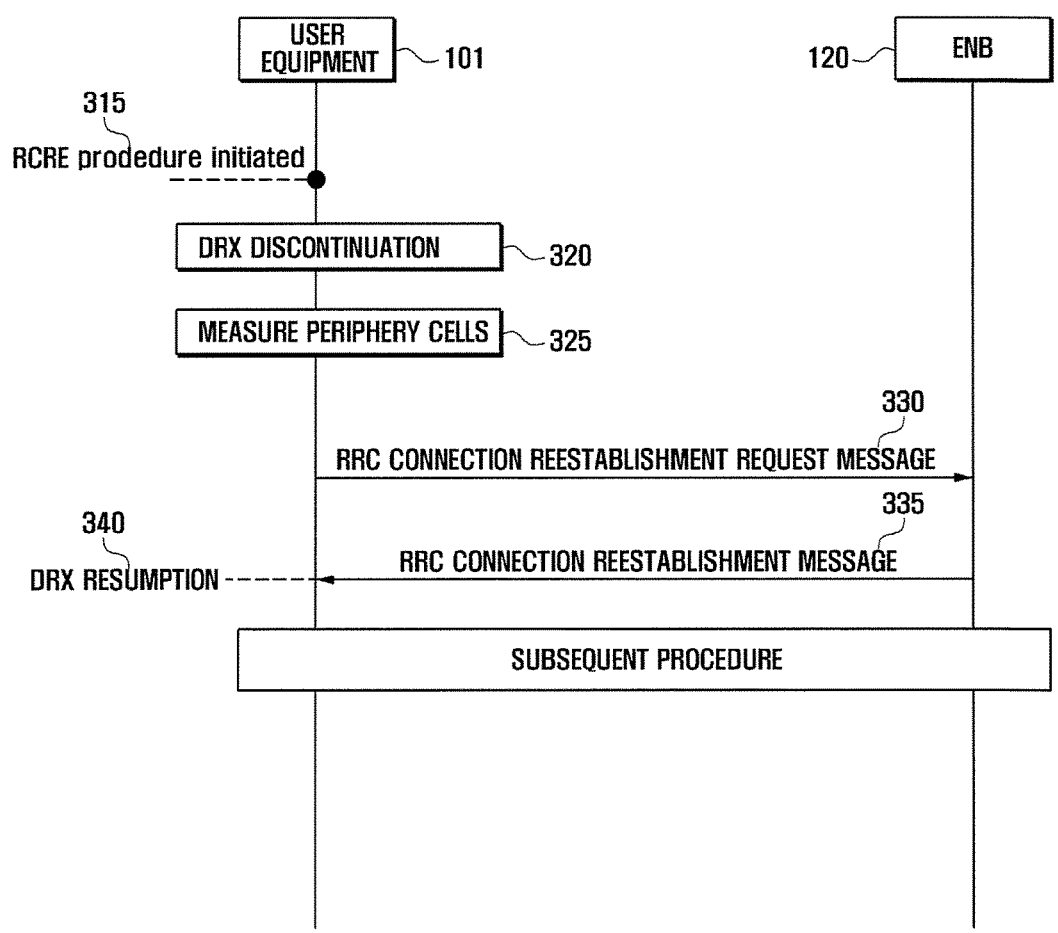
FIG. 3 is a signal flow chart describing a method for resuming discontinuous reception after an RRC connection reestablishment between user equipment and an ENB, according to a first embodiment of the present invention.
Figure 4:
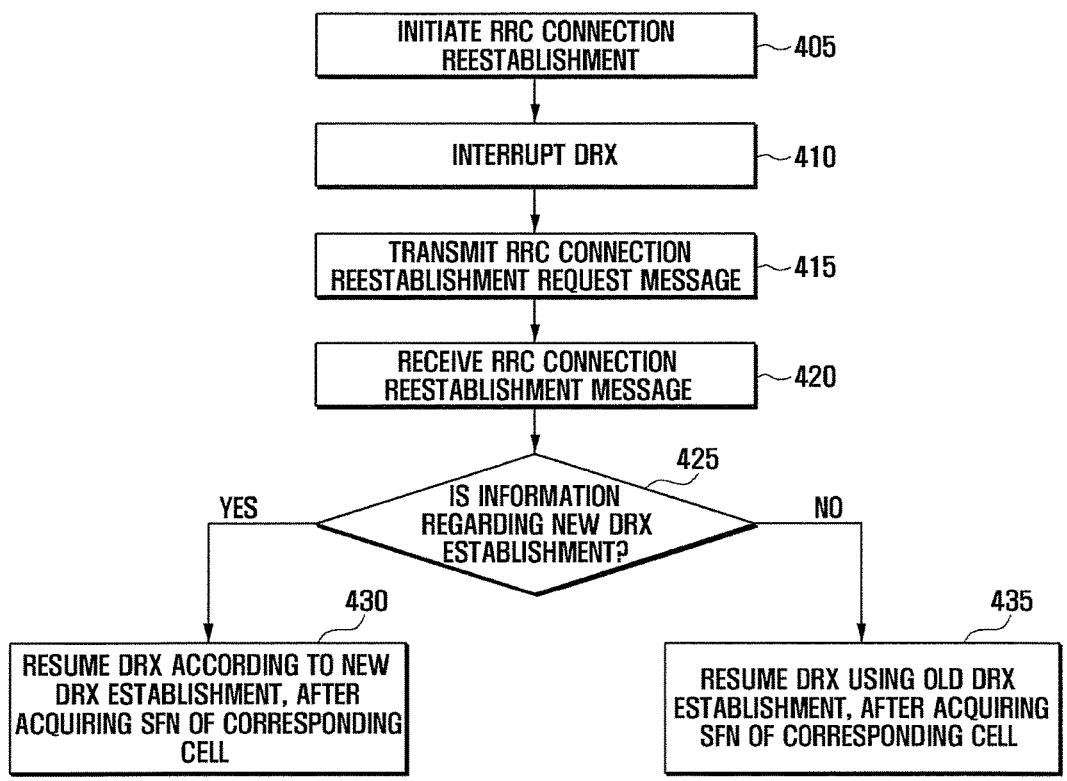
FIG. 4 is a flow chart describing an operation method of user equipment in the first embodiment of the present invention shown in FIG. 3.
Figure 5:
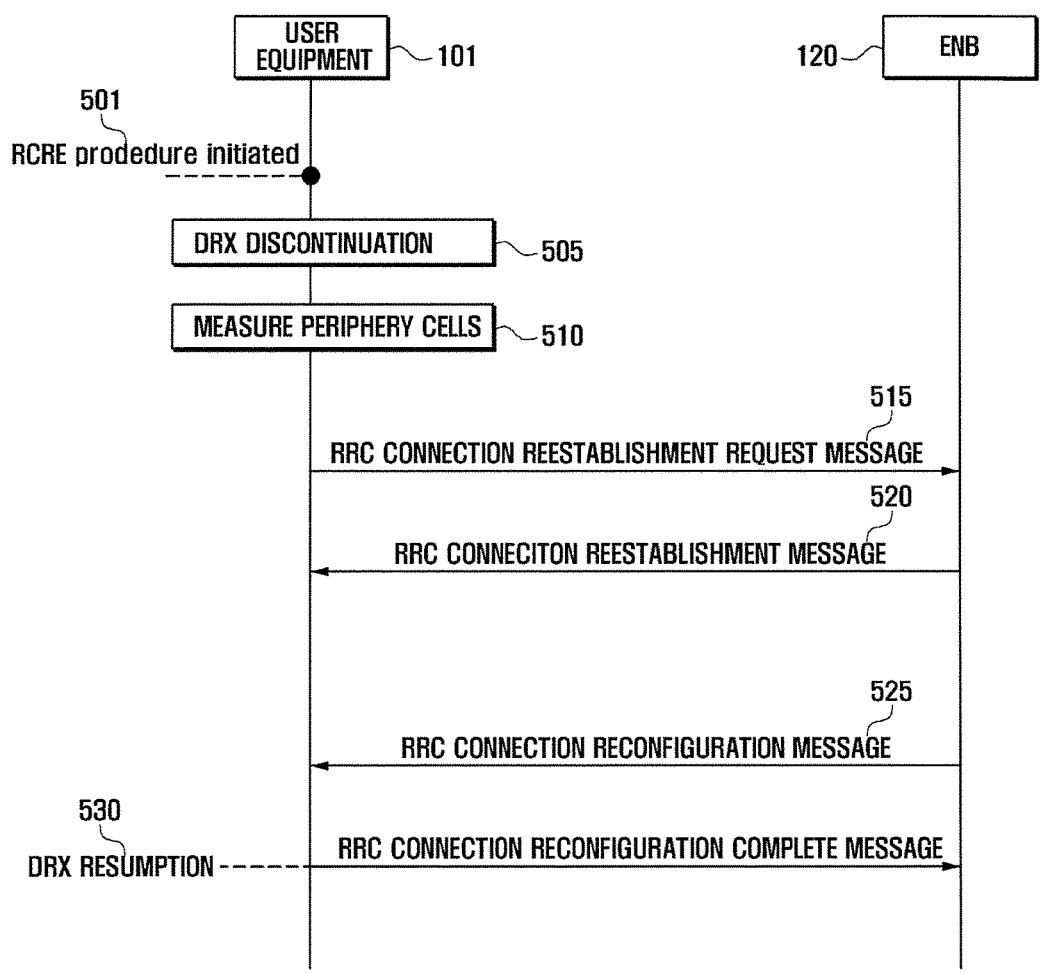
FIG. 5 is a signal flow chart describing a method for resuming discontinuous reception after an RRC connection reconfiguration between user equipment and an ENB, according to a second embodiment of the present invention.
Figure 6:
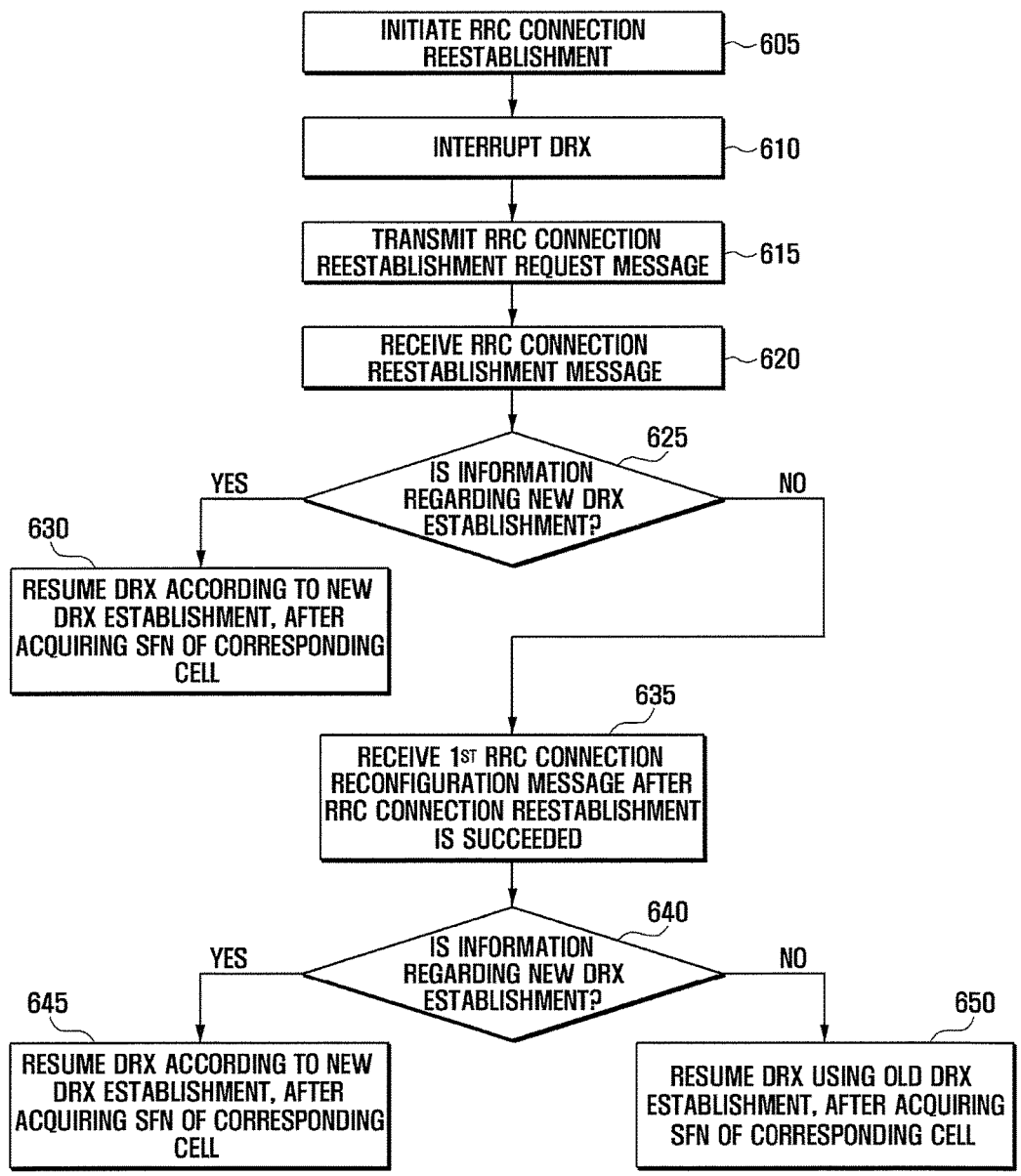
FIG. 6 is a flow chart describing an operation method of user equipment in the second embodiment of the present invention shown in FIG. 5.
Figure 10:
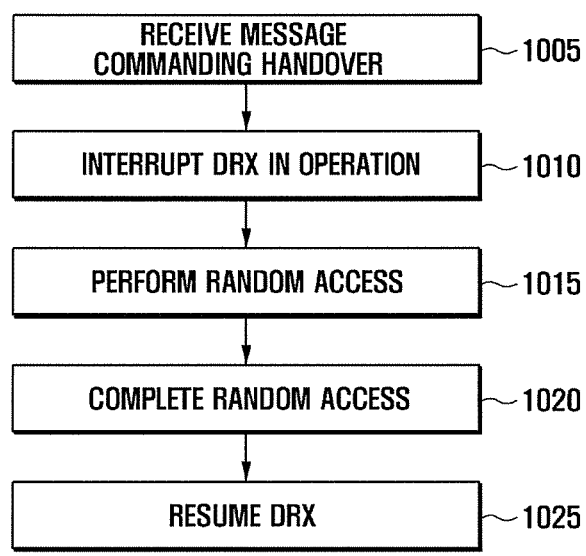
FIG. 10 is a flow chart describing a method for resuming a DRX operation in user equipment that is performing a handover.
Figure 11:
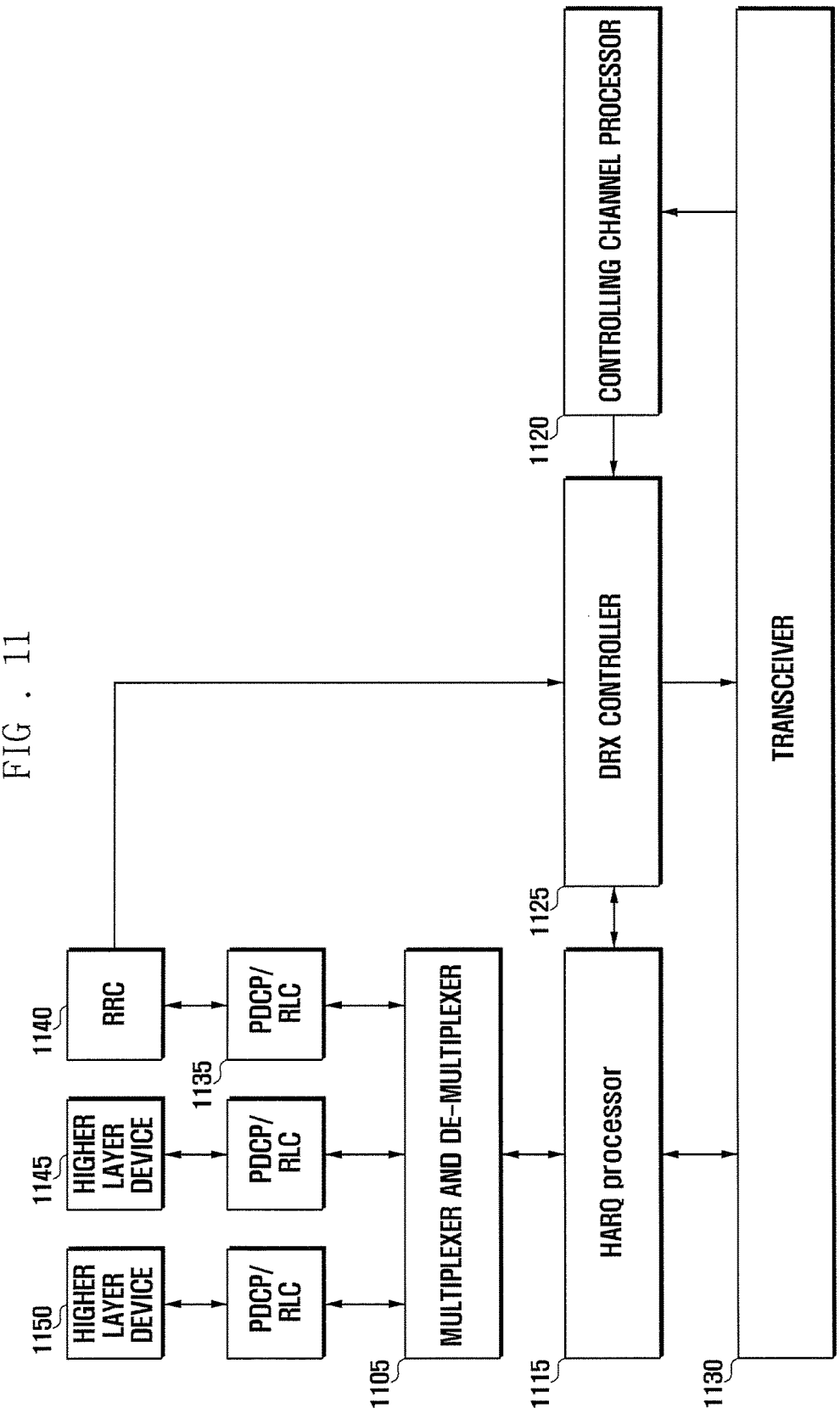
FIG. 11 is a schematic block diagram illustrating user equipment according to an embodiment of the present invention.

In the following description, FIGS. 1, 2, and 11 are commonly applied to the first to third embodiments. FIGS. 3 and 4 illustrate the first embodiment. FIGS. 5 and 6 show the second embodiments. FIGS. 7 to 10 depict the third embodiments.

FIG. 1 is a schematic block diagram illustrating a next generation mobile communication system according to an embodiment of the present invention. In an embodiment of the present invention, it is assumed that the mobile communication system is based on the UMTS system.

Referring to FIG. 1, the evolved radio access network (E_RAN) 110, 112 is simplified with two node systems, such as an evolved node B (ENB) and an access gateway. In an embodiment of the present invention, the ENB may be a plurality of ENB 120, 122, 124, 126, and 128, and the access gateway may also be a plurality of access gateways 130 and 132. User equipment 101 is connected to an Internet protocol (IP) network via the E_RAN 110 and 112.

The ENBs 120 to 128 correspond to conventional node B in the UMTS system and are connected to the user equipment 101 via a radio channel. The ENBs 120 to 128 serve to perform more complicated functions than the conventional node B does. In the LTE system, since all user traffic is serviced via a shared channel and a real time service via a Voice over IP (VoIP), an apparatus collects state information regarding user equipment 101 and perform scheduling, which is performed by the ENB 120 to 128. In order to achieve the transmission rate of 100 Mbps maximum, the LTE system employs orthogonal frequency division multiplexing (OFDM) of a bandwidth of 20 MHz maximum, as a radio connection technology. The LTE system also uses an adaptive modulation & coding (AMC) that determines a modulation scheme and a channel coding rate, according to the channel state of the user equipment 101.

FIG. 2 is a view illustrating radio protocol standardized in an LTE system.

Referring to FIG. 2, the radio protocol of the LTE system includes packet data convergence protocol (PDCP) 205 and 240, radio link control (RLC) 210 and 235, and medium access control (MAC) 215 and 230.

The PDCP 205 and 240 serves to compress/decompress an IP header, make ratio/inverse ratio, support a lossless handover, and so forth. The RLC 210 and 235 reconfigure packet data convergence protocol (PDCP) packet data unit (PDU) to a proper size and perform an ARQ. The PDU hereinafter is referred to a packet that is output from a particular layer device. The MAC 215 and 230 are connected to a plurality of RLC devices in user equipment 101. The MAC 215 and 230 multiplex the RLC PDU to the MAC PDU and de-multiplex the MAC PDU to the RLC PDU. The PHY 220 and 225 channel-encode and modulate data in the higher layer, generate OFDM symbols, and transmit them in a radio channel. The PHY 220 and 225 receive OFDM symbols in a radio channel, demodulate and channel-decode the OFDM, and then transfer them to the higher layer.

Embodiment 1

A detailed description explains how user equipment 101 resumes a discontinuous reception (DRX) after performing an RRC connection reestablishment.

FIG. 3 is a signal flow chart describing a method for resuming discontinuous reception after user equipment 101 performs an RRC connection reestablishment with an ENB 120, according to a first embodiment of the present invention.

Referring to FIG. 3, when an RRC connection reestablishment procedure is initiated, the user equipment 101 measures the channel quality of periphery cells to perform cell selection. If the user equipment 101 measures the channel quality and performs a DRX, simultaneously, it may require more time to perform the channel quality measurement.

The discontinuous reception refers to an operation where user equipment 101 monitors a forward control channel of a current cell for a certain time period and retains a sleep state for the remaining period of time, if an ENB does not perform a scheduling with respect to the user equipment 101. Generally, the user equipment 101 measures the channel quality of periphery cells for the sleep state. In particular, measurement for cells whose frequency bands differ from each other or whose radio accesses differ from each other cannot be simultaneously performed with forward control channel monitoring of a current cell. Therefore, retaining the discontinuous reception by the user equipment 101 may delay the measurement of a cell, whose frequency bands differ from each other or whose radio accesses differ from each other, for a period of time that a current cell utilizes to monitor the forward control channel.

When the RRC connection reestablishment procedure is initiated 315, the user equipment 101 interrupts the current DRX 320. The user equipment 101 performs a measurement 325 to select a new cell according to a certain procedure. If the user equipment 101 selects a cell satisfying certain conditions, it transmits an RRC connection reestablishment request message 330 to the ENB 120 via a random access channel of the selected cell. The message contains a cell-radio network temporary identity (C-RNTI) for the user equipment 101 that the user equipment 101 has used in a cell before performing the RRC connection reestablishment procedure. When the ENB 120 receives the message, it checks whether to reestablish an RRC connection with the user equipment 101 using the C-RNTI of the user equipment 101 and the cell identifier.

If the ENB 120 ascertains that it can reestablish an RRC connection with the user equipment 101, it transmits an RRC connection reestablishment message 335 to the user equipment 101. The user equipment 101 receives the message and resumes a signaling radio bearer, as SRB 1. If the RRC connection reestablishment message does not contain setting information regarding new SRB 1, the user equipment 101 resumes the SRB 1 using the previous settings used before the RRC connection reestablishment 340. Thereafter, a subsequent procedure is performed.

The term 'radio bearer' refers to a passage through which data is transferred via a radio channel. Generally, one radio bearer per service is set. A radio bearer includes a PDCP, an RLC, and a MAC, which are set to process data for a particular service. The term 'SRB' refers to a radio bearer that allows for the transmission and reception of an RRC control message. Two SRB (SRB 1 and SRB 2) may be set to one user equipment 101. A radio bearer processing general user data is called a data radio bearer (DRB).

When an RRC connection reestablishment procedure is initiated, i.e., when one of the initiation events in an RRC connection reestablishment procedure occurs, the user equipment 101 interrupts a currently performing DRX. If the RRC connection reestablishment procedure has succeeded and terminated and SRB 1 is resumed, the user equipment 101 resumes the DRX. That is, in embodiment 1, if the user equipment 101 receives an RRC connection reestablishment message, it resumes a discontinuous reception. In this case, if the RRC connection reestablishment message does not contain new discontinuous reception setting information, the user equipment 101 resumes the discontinuous reception using the discontinuous reception settings used before the RRC connection reestablishment. Alternatively, if the RRC connection reestablishment message contains new discontinuous reception setting information, the user equipment 101 resumes the discontinuous reception according to the new discontinuous reception settings.

FIG. 4 is a flow chart describing an operation method of user equipment 101 in the first embodiment of the present invention shown in FIG. 3.

Referring to FIG. 4, when an RRC connection reestablishment procedure is initiated (block 405), the user equipment 101 interrupts the current DRX (block 410). If a situation, such as a radio link failure, a failure to perform a setting command instructed by an ENB, and the like, has occurred, the user equipment 101 interrupts a DRX and initiates an RRC connection reestablishment procedure. The user equipment 101 interrupts monitoring a forward control channel for a certain period of time at a time point, and then performs measurement to select a cell where an RRC connection reestablishment procedure will be performed.

If the user equipment 101 detects a cell that will perform an RRC connection reestablishment procedure, it selects the cell and then transmits an RRC connection reestablishment request message to an ENB that controls the selected cell (block 415). If the ENB that received the RRC connection reestablishment request message corresponds to an ENB that can reestablish an RRC connection of the user equipment 101, the RRC connection reestablishment request message contains an identifier for identifying the user equipment 101. In that case, the ENB detects the user equipment identifier contained in the message and then determines whether to accept or reject the RRC connection reestablishment.

If the ENB recognizes the user equipment 101, or has information necessary for the RRC establishment of the user equipment 101, it transmits the RRC connection reestablishment message to the user equipment 101. If the user equipment 101 receives the RRC connection reestablishment message from the ENB (block 420), it checks whether the RRC connection reestablishment message contains new DRX setting information (block 425). The DRX setting information corresponds to a period of the DRX or a time length of a timer used for the DRX.

If the user equipment 101 ascertains that the RRC connection reestablishment message contains new DRX setting information at block 425, it acquires an SFN of a corresponding cell and then resumes a DRX using the newly received DRX setting information (block 430). The SFN refers to a counter that increases by one per preset period of time. The user equipment 101 and the ENB can commonly recognize a time point through the SFN. In an embodiment of the present invention, the preset time period is 10 ms. The SFN is broadcast through system information.

Alternatively, if the user equipment 101 ascertains that the RRC connection reestablishment message does not contain new DRX setting information at block 425, it acquires an SFN of a corresponding cell and then resumes a DRX using the DRX setting information that was used before the RRC connection reestablishment was initiated (block 435).

Embodiment 2

A detailed description explains how user equipment 101 resumes a discontinuous reception (DRX) after performing RRC connection reconfiguration. That is, the user equipment 101, having performed the RRC connection reestablishment, receives an RRC connection reconfiguration message and then resumes a DRX.

FIG. 5 is a signal flow chart describing a method for resuming discontinuous reception after RRC connection reconfiguration between user equipment and an ENB, according to a second embodiment of the present invention.

Referring to FIG. 5, the RRC connection reestablishment procedure is performed by exchanging an RRC connection reestablishment request message 515 with an RRC connection reestablishment message 520. Through this exchanging process, only SRB 1 is resumed. The ENB has completed the RRC connection reestablishment and then processes an RRC connection reconfiguration to resume operations of radio bearers other than the SRB 1. That is, if the user equipment 101 receives an RRC connection reconfiguration message from the ENB, it resumes a discontinuous reception.

FIG. 6 is a flow chart describing an operation method of user equipment 101 in the second embodiment of the present invention shown in FIG. 5.

Referring to FIG. 6, when an RRC connection reestablishment procedure is initiated (block 605), the user equipment 101 interrupts the current DRX (block 610). If a situation, such as a radio link failure, a non-performance of a setting command instructed by an ENB, and the like, has occurred, the user equipment 101 interrupts a discontinuous reception and initiates an RRC connection reestablishment procedure. The user equipment 101 interrupts monitoring a forward control channel for a certain period of time at a time point, and then performs a measurement to select a cell where an RRC connection reestablishment procedure will be performed. If the user equipment 101 detects a cell that will perform an RRC connection reestablishment procedure, it selects the cell and then transmits an RRC connection reestablishment request message to an ENB that controls the selected cell (block 615).

If the ENB that received the RRC connection reestablishment request message corresponds to an ENB that can reestablish an RRC connection of the user equipment 101, the RRC connection reestablishment request message contains an identifier for identifying the user equipment 101. In that case, the ENB detects the user equipment identifier contained in the message and then determines whether to accept or reject the RRC connection reestablishment.

If the ENB recognizes the user equipment 101, or has information necessary for the RRC establishment of the user equipment 101, it transmits the RRC connection reestablishment message to the user equipment 101. If the user equipment 101 receives the RRC connection reestablishment message from the ENB (block 620), it checks whether the RRC connection reestablishment message contains new DRX setting information (block 625). The DRX setting information corresponds to a period of the discontinuous reception or a time length of a timer used for the discontinuous reception.

If the user equipment 101 ascertains that the RRC connection reestablishment message contains new DRX setting information at 625, it acquires an SFN of a corresponding cell and then resumes a DRX using the newly received DRX setting information (block 630). For example, if the ENB wishes to control the user equipment 101 to start the DRX immediately after the user equipment 101 receives the RRC connection reestablishment message, it will include the DRX setting information in the RRC connection reestablishment message.

Alternatively, if the user equipment 101 ascertains that the RRC connection reestablishment message does not contain new DRX setting information at block 625, it interrupts the DRX and waits until it receives an RRC connection reconfiguration message (block 635). The RRC connection reconfiguration message contains information for resuming operations or radio bearers other than SRB in the user equipment 101. If the user equipment 101 first receives the RRC connection reconfiguration message after the RRC connection reestablishment procedure is successfully carried out, it determines whether the RRC connection reconfiguration message contains DRX setting information (block 640).

If the user equipment 101 ascertains that the RRC connection reconfiguration message contains DRX setting information at 640, it acquires an SFN of a corresponding cell and then resumes a DRX according to the new DRX setting information (block 645). Alternatively, if the user equipment 101 ascertains that the RRC connection reconfiguration message does not contain DRX setting information at block 640, it resumes the DRX according to the DRX setting that was used before the RRC connection reestablishment process was performed.

Embodiment 3

A detailed description explains how user equipment 101 resumes a discontinuous reception (DRX) after a handover is completed.

If the user equipment 101 that is performing a DRX performs a handover, it needs to interrupt the DRX at a proper time point and then resume it. Embodiment 3 relates to a method and apparatus where the user equipment 101 interrupts and resumes the DRX when it performs a handover.

Figure 7:
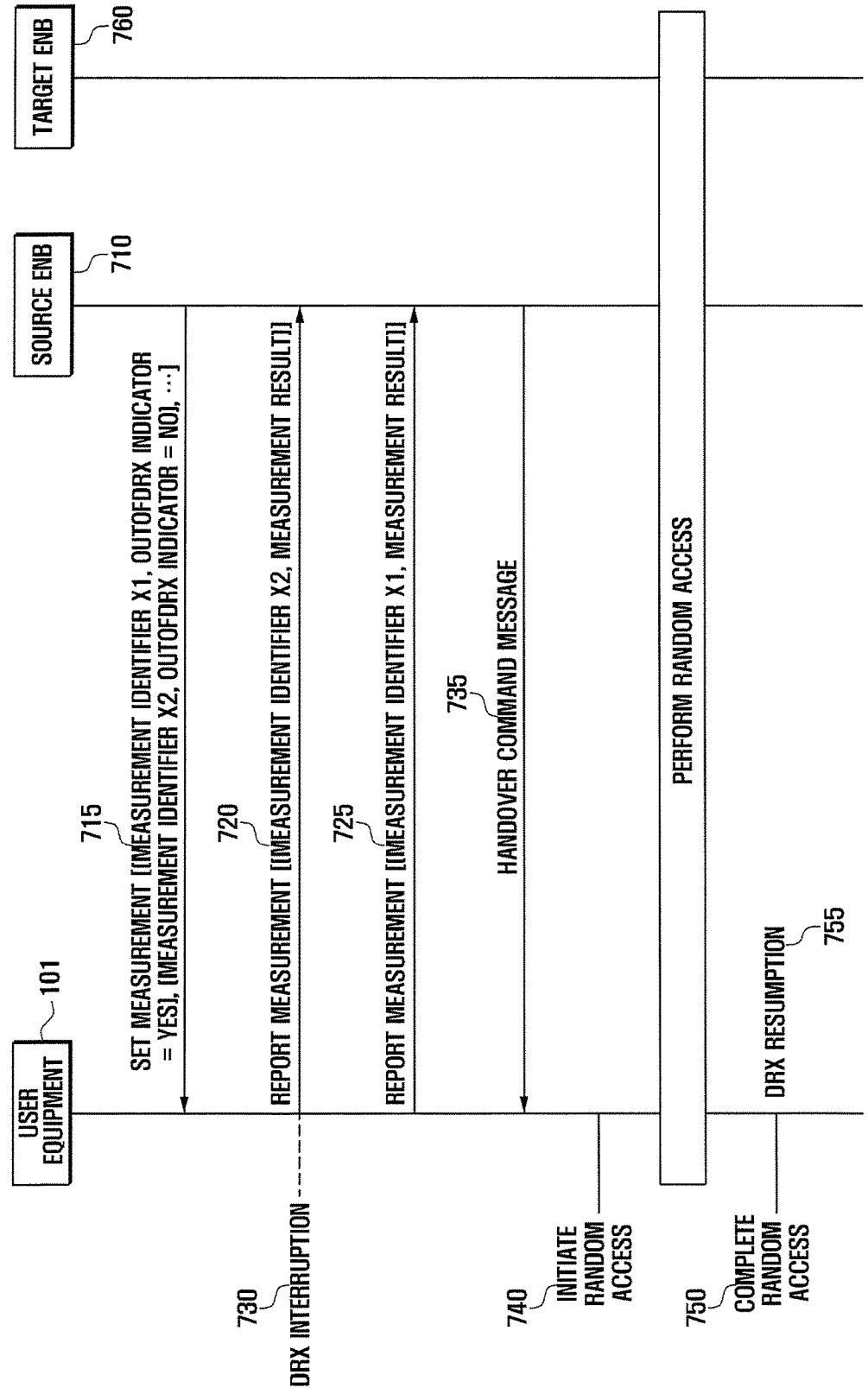
FIG. 7 is a signal flow chart describing a method for resuming discontinuous reception after user equipment has competed a handover, according to a third embodiment of the present invention.

FIG. 7 is a signal flow chart describing a method for resuming discontinuous reception after user equipment 101 has competed handover, according to a third embodiment of the present invention.

Referring to FIG. 7, in order to perform a handover, a source ENB 710 sets the user equipment 101 through measurement configuration, according to whether a measurement result is generated when an object to be measured satisfies a certain condition and is then transmitted to the ENB. That is, the source ENB 710 incorporates the measurement configuration in a proper RRC message at a certain time point after the RRC connection state of the user equipment 101 changes, and then transmits it to the user equipment 101.

It should be understood that user equipment 101 may be composed of a plurality of measurements. The measurement configuration is illustrated in FIG. 8.

Figure 8:
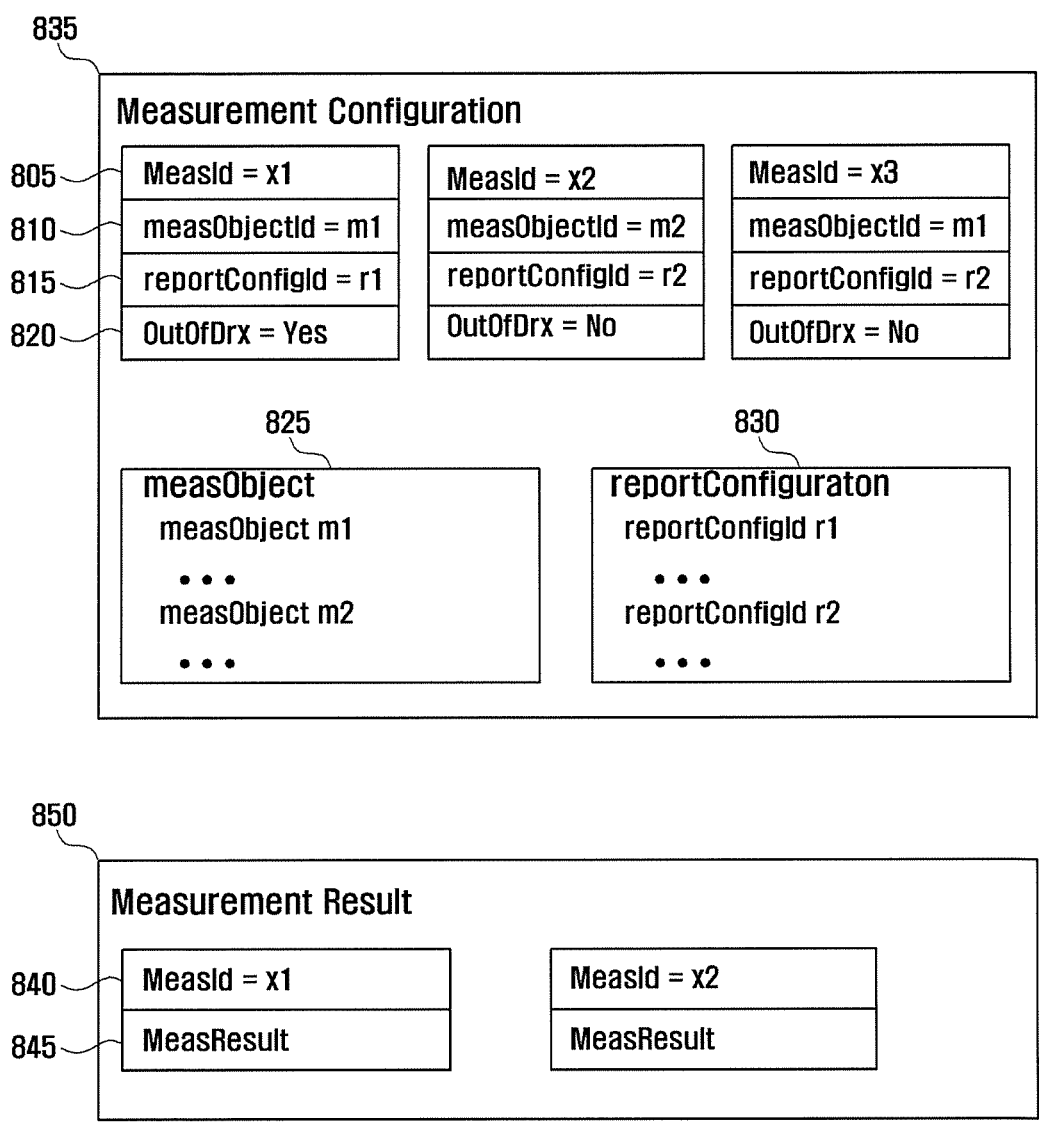
FIG. 8 is a schematic block diagram illustrating measurement configuration information transmitted from an ENB to user equipment.

FIG. 8 is a schematic block diagram illustrating measurement configuration information transmitted from an ENB to user equipment.

As shown in FIG. 8, one measurement comprises a measurement ID (MeasId), a measurement object ID (measObjectId), and a reporting configuration ID (reportConfigId). For example, a particular measurement may be set in such away that the measurement ID is x1 (805), the measurement object ID is m1 (810), and the reporting configuration ID is r1 (815). The symbols m1 and r1 correspond to additional information 825 and 830, respectively.

When the user equipment 101 receives the measurement configuration from the source ENB 710, a measurement is performed with respect to a measurement object of m1. If the measurement result corresponds to a condition that is proposed in the measurement report settings of r1, the user equipment 101 prepares a measurement result report message 850 containing the measurement result and transmits it to the source ENB 710. The measurement result report message contains a measurement result 845 and the measurement result has a corresponding measurement identifier x1 840.

Measurement is performed to support a handover of user equipment 101. There are many reasons to perform measurement. For example, the ENB may instruct the user equipment 101 to reduce inter cell interference.

In embodiment 3, when the source ENB 710 sets a measurement in the user equipment 101, it transmits information to the user equipment 101, instructing that the user equipment 101 transmits a measurement result report and then interrupts a DRX with respect to a measurement that will be likely to generates a handover. The information is hereinafter called an 'OutOfDrx indicator' 820.

Referring back to FIG. 7, the source ENB 710 sets two measurements, with respect to user equipment 101 and then transmits them to the user equipment 101 (block 715). Here, the two measurements are set in such a way that the OutOfDrx indicator, as a measurement identifier x1, is set to Yes and the OutOfDrx indicator, as a measurement identifier x2, is set to No.

The user equipment 101 reports the measurement result for the measurement where the OutOfDrx indicator is set to 'No' to the source ENB 710, or transmits a measurement result report message containing the measurement result of the measurement identifier, x2 720, to the source ENB 710. Thereafter, the user retains the DRX.

Additionally, the user equipment 101 reports the measurement result for the measurement where the OutOfDrx indicator is set to 'Yes' to the source ENB 710, or transmits a measurement result report message containing the measurement result of the measurement identifier, x1 725, to the source ENB 710. Thereafter, the user equipment 101 interrupts the DRX (730).

If the source ENB 710 receives the measurement result, it determines whether to perform a handover based on the measurement result. The source ENB 710 prepares a handover by exchanging a message with a target ENB 760 that will be perform a handover 735 and then transmits a message commanding a handover to the user equipment 101.

When the user equipment 101 receives the handover command message, it moves to a target cell indicated by the source ENB 710 and then initiates a random access 740 in the target cell to transmit a message, indicating that the handover has been completed, to the source ENB 710. The random access is performed 745 in such a way that the user equipment 101 transmits a preamble to the target ENB 760, receives a response to the preamble from the target ENB 760, and transmits a reverse message according to information containing the response message. Successfully completing the random access means that the target ENB 760 recognizes the user equipment 101. Therefore, the time point that the random access has been completed is the earliest time point to resume the DRX. In an embodiment of the present invention, if the random access is successfully completed in a target cell, the user equipment 101 resumes the DRX 755.

Figure 9:
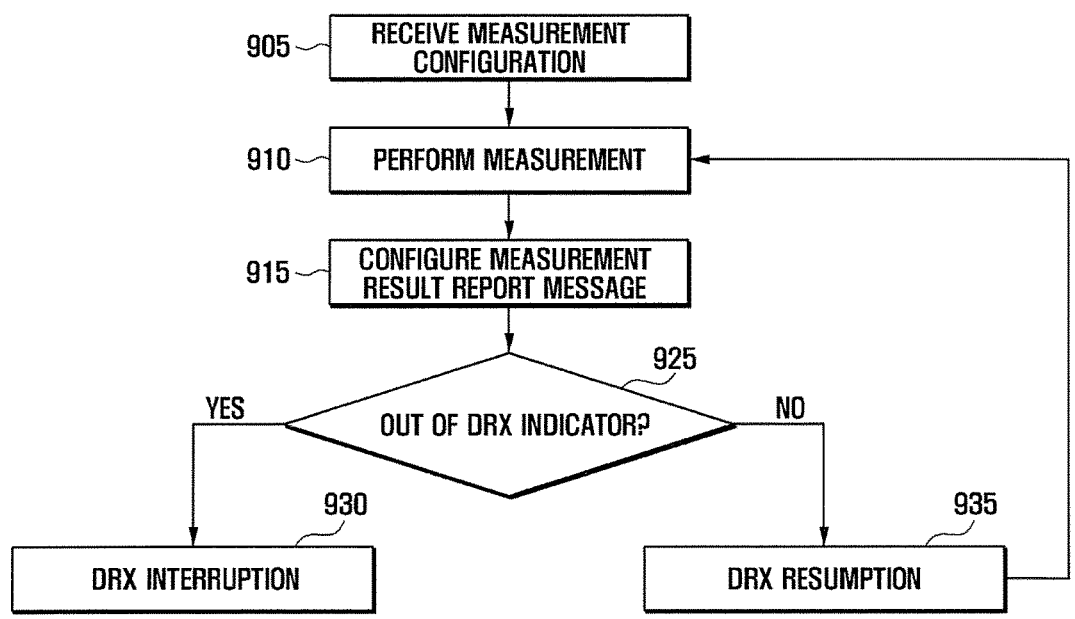
FIG. 9 is a flow chart describing an operation method of user equipment in the third embodiment of the present invention shown in FIG. 7.

FIG. 9 is a flow chart describing an operation method of user equipment 101 in the third embodiment of the present invention shown in FIG. 7.

The user equipment 101 receives the measurement configuration from the source ENB 710 (block 905). The measurement configuration may contain information regarding a plurality of measurements. Information regarding one measurement is composed of a measurement identifier, a measurement object identifier, a measurement report configuration identifier, and an OutOfDrx indicator. The source ENB 710 sets the OutOfDrx indicator for determining a handover to 'Yes', which is one of the measurements for setting the user equipment 101. The user equipment 101 sets the measurement according to the measurement configuration received from the source ENB 710 and performs the configured measurements (block 910). If a preset condition is satisfied with a measurement report configuration, the user equipment 101 configures a measurement result report message that contains the measurement result satisfying a corresponding condition (block 915). The measurement result report message contains a measurement result report and a measurement identifier of a corresponding measurement.

After that, the user equipment 101 determines whether the measurement result, contained in the configured measurement result report message, has a measurement identifier of a measurement where the OutOfDrx indicator is set to 'Yes' (block 925). If the user equipment 101 ascertains that the measurement result has a measurement identifier of a measurement where the OutOfDrx indicator is set to Yes at 925, the measurement result report message may cause a handover. Therefore, the user equipment 101 interrupts the current DRX (block 930). Alternatively, if the user equipment 101 ascertains that the measurement result does not have a measurement identifier of a measurement where the OutOfDrx indicator is set to 'Yes' at block 925, it retains the current DRX (block 935), and then returns to and proceeds with 910 where a measurement is performed.

FIG. 10 is a flow chart describing a method for resuming a DRX in user equipment 101 that is performing a handover.

When the user equipment 101 receives an RRC message commanding a handover from the source ENB 710 (block 1005), it interrupts a current DRX (block 1010). Generally, the user equipment 101 transmits a measurement result report, containing a measurement identifier where the OutOfDrx indicator is set to 'Yes', to the ENB and then interrupts the DRX. However, the ENB may determine a handover in a state where it does not receive the measurement result report from the user equipment 101. In that case, the DRX may be still being performed in a state where a message commanding a handover is being transmitted from the ENB to the user equipment.

The user equipment 101 performs a handover according to the information contained in the message commanding the handover. That is, the user equipment 101 synchronizes with a cell indicated by the message and performs a random access through a random access channel of the cell (block 1015). The user equipment 101 may transmit an RRC message, notifying that the handover has been successfully completed, to the source ENB 710 via the random access. Thereafter, the user equipment 101 completes the random access (block 1020). The time point that the random access has been completed depends on whether the user equipment 101 uses a dedicated preamble, and is defined in 36.321 of the 3GPP standard.

After completing the random access at 1020, the user equipment 101 acquires an SFN of the cell and then resumes a DRX (block 1025). If the message commanding a handover contains new DRX configuration information, the user equipment 101 performs a DRX according to the new DRX configuration information. Alternatively, if the message commanding a handover does not contain new DRX configuration information, the user equipment 101 performs the DRX according to the DRX configuration that the user used in the previous cell.

FIG. 11 is a schematic block diagram illustrating user equipment 101 according to an embodiment of the present invention.

The user equipment 101 includes a multiplexer and de-multiplexer 1105, a HARQ processor 1115, a transceiver 1130, a DRX controller 1125, a control channel processor 1120, a PDCP/RLC 1135, higher layer devices 1145 and 1150, and an RRC device (or a radio resource controller) 1140.

The transceiver 1130 is turned on or off according to the control of the DRX controller 1125. The DRX controller 1125 controls the discontinuous reception for the transmission and reception, according to a rule. The DRX controller 1125 interrupts or resumes a DRX according to the control of the RRC device 1140.

The HARQ processor 1115 processes an HARQ packet, received by the transceiver 1130, via an HARQ operation and transmits an HARQ packet with no error to the de-multiplexer 1105. The HARQ processor 1115 also receives packets from the multiplexer 1105 and transmits them to the transceiver 1130 via an HARQ operation.

The multiplexer and de-multiplexer 1105 multiplexes packets, generated in the higher layer devices 1145 and 1150, to one HARQ packet, and then transmits it to the HARQ processor 1115. The multiplexer and de-multiplexer 1105 also de-multiplexes packets, transmitted from the HARQ processor 1115, and then transmits them to a proper higher layer 1145 or 1150.

The PDCP/RLC 1135 is configured to each radio bearer. The PDCP/RLC 1135 processes data, transmitted from the higher layer devices 1145 and 1150 or the RRC device 1140, and transmits it to the multiplexer and de-multiplexer. The PDCP/RLC 1135 also processes data, transmitted from the multiplexer and de-multiplexer 1105, and transmits it to the higher layer devices 1145 and 1150 or the RRC device 1140.

In embodiment 1 according to the present invention, the RRC device 1140 commands the DRX controller 1125 to interrupt the DRX operation when an RRC connection reestablishment is initiated, and to resume the DRX operation when receiving an RRC connection reestablishment message.

In embodiment 2 according to the present invention, the RRC device 1140 controls the DRX controller 1125 to interrupt the DRX operation when an RRC connection reestablishment is initiated, and to resume the DRX operation when receiving an RRC connection reconfiguration message.

In embodiment 3 according to the present invention, the RRC device 1140 controls the DRX controller 1125 to interrupt the DRX operation when the user equipment 101 transmits a measurement result report message, containing a measurement identifier where the OutOfDrx indicator is set to Yes, to the ENB, and to resume the DRX operation when a random access to transmit a handover completion message is completed in a target cell.

As described above, the method and apparatus for controlling discontinuous reception (DRX), according to the present invention, can interrupt or resume the DRX at a proper time point when an RRC connection is reestablished or a handover is performed, thereby reducing power consumption in the user equipment.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for controlling a discontinuous reception (DRX) by a terminal in a wireless communication system, the method comprising:
    transmitting a radio resource control (RRC) message to set up an RRC connection state with a first node, to the first node;
    transmitting a signal while performing a first DRX operation based on first DRX configuration information in the RRC connection state, to the first node;
    in response to detecting a failure of the RRC connection with the first node, initiating an RRC connection re-establishment procedure for re-establishing an RRC connection with a second node, wherein the initiating the RRC connection re-establishment procedure comprises:
    releasing the first DRX configuration information,
    transmitting an RRC connection re-establishment request to the second node,
    receiving an RRC connection re-establishment message from the second node, and
    identifying whether second DRX configuration information is included in the RRC connection re-establishment message;
    performing a second DRX operation based on a system frame number for the second node and the second DRX configuration information in case that the second DRX configuration information is included in the RRC connection re-establishment message; and
    performing the second DRX operation based on the first DRX configuration information in case that the second DRX configuration information is not included in the RRC connection re-establishment message,
    wherein the second DRX configuration information comprises information associated with a DRX period, and
    wherein the system frame number is identified based on system information received from the second node.

2. The method of claim 1, further comprising:
    transmitting an RRC connection re-establishment request message to the second node; and
    receiving the RRC connection re-establishment message from the second node in response to transmitting the RRC connection re-establishment request message.

3. The method of claim 1, further comprising:
    initiating the RRC connection re-establishment procedure in case that the terminal detects at least one of a radio link failure, a handover failure, or a failure to perform a command configured by the first node.

4. The method of claim 1, further comprising:
    after the RRC connection re-establishment procedure is successfully completed, attempting to receive an RRC connection reconfiguration message, in case that the second DRX configuration information is not included in the RRC connection re-establishment message;
    identifying whether third DRX configuration information is included in the RRC connection reconfiguration message;
    performing a third DRX operation based on the third DRX configuration information in case that the third DRX configuration information is included in the RRC connection reconfiguration message; and
    performing the third DRX operation based on the first DRX configuration information in case that the third DRX configuration information is not included in the RRC connection reconfiguration message.

5. A terminal in a wireless communication system, the terminal comprising:
    a transceiver configured to transmit and receive a signal; and
    a controller configured to:
    transmit a radio resource control (RRC) message to set up an RRC connection state to a first node,
    transmit a signal while performing a first a discontinuous reception (DRX) operation based on first DRX configuration information in the RRC connection state, to the first node, and
    in response to detecting a failure of the RRC connection with the first node, initiate an RRC connection re-establishment procedure for re-establishing an RRC connection with a second node, wherein, in the RRC connection re-establishment procedure, the controller is further configured to:
    release the first DRX configuration information;
    transmit an RRC connection re-establishment request to the second node,
    receive an RRC connection re-establishment message from the second node,
    identify whether second DRX configuration information is included in the RRC connection re-establishment message,
    perform a second DRX operation based on a system frame number for the second node and the second DRX configuration information with the second node in case that the second DRX configuration information is included in the RRC connection re-establishment message, and
    perform the second DRX operation based on the first DRX configuration information in case that the second DRX configuration information is not included in the RRC connection re-establishment message,
    wherein the second DRX configuration information comprises information associated with a DRX period, and
    wherein the system frame number is identified based on system information received from the second node.

6. The terminal of claim 5, wherein the controller is configured to:
    transmit an RRC connection re-establishment request message to the second node, and
    receive the RRC connection re-establishment message from the second node in response to transmitting the RRC connection re-establishment request message.

7. The terminal of claim 5, wherein the controller is configured to initiate the RRC connection re-establishment procedure in case that the terminal detects at least one of a radio link failure, a handover failure, or a failure to perform a command configured by the first node.

8. The terminal of claim 5, wherein the controller is configured to:
   after the RRC connection re-establishment procedure is successfully completed, attempt to receive an RRC connection reconfiguration message, in case that the second DRX configuration information is not included in the RRC connection re-establishment message;
   identify whether third DRX configuration information is included in the RRC connection reconfiguration message;
   perform a third DRX operation based on the third DRX configuration information in case that the third DRX configuration information is included in the RRC connection reconfiguration message; and
   perform the third DRX operation based on the first DRX configuration information in case that the third DRX configuration information is not included in the RRC connection reconfiguration message.

9. A method for controlling a discontinuous reception (DRX) by a first base station in a wireless communication system, the method comprising:
   receiving a radio resource control (RRC) connection re-establishment request from a terminal;
   generating an (RRC connection re-establishment message in response to the RRC connection re-establishment request; and
   transmitting the RRC connection re-establishment message, including new DRX configuration information, to the terminal,
   wherein an RRC connection re-establishment procedure is initiated in response to a failure being detected in an RRC connection between a second base station and the terminal, wherein a first DRX configuration information configured by the second base station is released at the terminal in case that the RRC connection re-establishment procedure for re-establishing an RRC connection is initiated between the first base station and the terminal,
   wherein a second DRX operation is performed by the terminal based on the new DRX configuration information, transmitted from the first base station, and a system frame number for the second base station in case that the new DRX configuration information is included in the RRC connection re-establishment message,
   wherein the second DRX operation is performed by the terminal based on the first DRX configuration information in case that the new DRX configuration information is not included in the RRC connection re-establishment message,
   wherein the new DRX configuration information comprises information associated with a DRX period, and
   wherein the system frame number is identified by the terminal based on system information transmitted from the first base station.

10. The method of claim 9, further comprising:
    receiving an RRC connection re-establishment request message from the terminal; and
    transmitting the RRC connection re-establishment message to the terminal in response to transmitting the RRC connection re-establishment request message.

11. The method of claim 9, wherein the RRC connection re-establishment procedure is initiated in case that at least one of a radio link failure, a handover failure, or a failure to perform a command configured by the first base station is detected by the terminal.

12. The method of claim 9,
    wherein after the RRC connection re-establishment procedure is successfully completed, a reception of an RRC connection reconfiguration message is attempted by the terminal, in case that the new DRX configuration information is not included in the RRC connection re-establishment message,
    wherein it is identified by the terminal whether third DRX configuration information is included in the RRC connection reconfiguration message,
    wherein a third DRX operation is performed by the terminal based on the third DRX configuration information in case that the third DRX configuration information is included in the RRC connection reconfiguration message, and
    wherein the third DRX operation is performed by the terminal based on the first DRX configuration information in case that the third DRX configuration information is not included in the RRC connection reconfiguration message.

13. A first base station in a wireless communication system, the first base station comprising:
    a transceiver configured to receive an radio resource control (RRC) connection re-establishment request from a terminal; and
    a controller configured to:
      generate an RRC connection re-establishment message in response to the RRC connection re-establishment request, and
      transmit the RRC connection re-establishment message, including new discontinuous reception (DRX) configuration information, to the terminal,
    wherein an RRC connection re-establishment procedure is initiated in response to a failure being detected in an RRC connection between a second base station and the terminal,
    wherein a first DRX configuration information configured by the second base station is released at the terminal in case that the RRC connection re-establishment procedure for re-establishing an RRC connection is initiated between the first base station and the terminal,
    wherein a second DRX operation is performed by the terminal based on the new DRX configuration information, transmitted from the first base station, and a system frame number for the second base station in case that the new DRX configuration information is included in the RRC connection re-establishment message,
    wherein the second DRX operation is performed by the terminal based on the first DRX configuration information in case that the new DRX configuration information is not included in the RRC connection re-establishment message,
    wherein the new DRX configuration information comprises information associated with a DRX period, and
    wherein the system frame number is identified by the terminal based on system information transmitted from the first base station.

14. The first base station of claim 13, wherein the controller is further configured to:
    receive an RRC connection re-establishment request message from the terminal, and
    transmit the RRC connection re-establishment message to the terminal in response to transmitting the RRC connection re-establishment request message.

15. The first base station of claim 13, wherein the RRC connection re-establishment procedure is initiated in case that at least one of a radio link failure, a handover failure, or a failure to perform a command configured by the first base station is detected by the terminal.

16. The first base station of claim 13,
- wherein after the RRC connection re-establishment procedure is successfully completed, a reception of an RRC connection reconfiguration message is attempted by the terminal, in case that the second DRX configuration information is not included in the RRC connection re-establishment message,
- wherein it is identified by the terminal whether third DRX configuration information is included in the RRC connection reconfiguration message,
- wherein a third DRX operation is performed by the terminal based on the third DRX configuration information in case that the third DRX configuration information is included in the RRC connection reconfiguration message, and
- wherein the third DRX operation is performed by the terminal based on the first DRX configuration information in case that the third DRX configuration information is not included in the RRC connection reconfiguration message.

\* \* \* \* \*